United States Patent Office 3,549,602
Patented Dec. 22, 1970

3,549,602
POLYSULFHYDRYL POLYMERS
Gregoire Kalopissis and André Viout, Paris, France, assignors to Societe Anonyme dite: L'Oreal
No Drawing. Continuation-in-part of application Ser. No. 463,890, June 14, 1965. This application Jan. 31, 1969, Ser. No. 795,717
Claims priority, application France, June 19, 1964, 978,830; Jan. 18, 1965, 2,338
Int. Cl. C08g 20/20
U.S. Cl. 260—78                                     17 Claims

ABSTRACT OF THE DISCLOSURE

New polysulfhydryl polymers for permanently deforming hair and the process of preparing them by reacting soluble polymers having acid anhydride groups with mercapto amide-amines.

---

This application is a continuation in part of application 463,890, filed June 14, 1965, which has been abandoned.

SUMMARY OF THE INVENTION

This invention relates to polysulfhydryl polymers and methods of preparing these polymers.

The new polysulfhydryl polymers of this invention are compounds having a recurring structural unit of the formula;

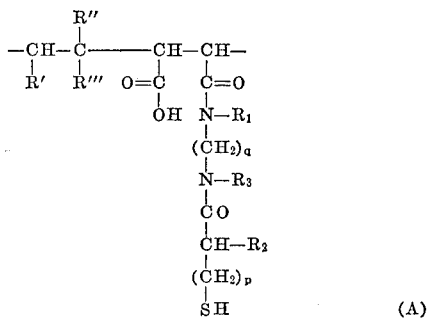

(A)

in which:

$R_1$ and $R_3$ represent hydrogen, a lower alkyl, for instance —$CH_3$ or —$C_2H_5$, or a lower hydroxylalkyl, for instance —$CH_2$—$CH_2$—OH;
$R_2$ represents hydrogen or —$CH_3$;
$q$ is an integer from 2 to 6 inclusive;
$p$ is 0 or 1;
R' and R", which can be the same or different, each represent hydrogen or a lower alkyl, phenyl or a lower alkoxy group; and
R''' represents hydrogen, —O—CO—$CH_3$, —C≡N, —$OC_2H_5$ or —CO—O—$CH_3$.

The "lower alkyl" and "lower alkoxy" groups referred to in this sepcification are preferably ones having 1–4 carbon atoms.

Polysulfhydryl polymers of particular interest, especially for treating human hair, are those whose molecular weight is sufficiently low for the polymer to be soluble in an alkaline aqueous medium. The polymers in aqueous alkaline solution form— SH links with human hair or other keratinic fibers and they can be used to impart permanent waves to the hair or fibers. The chemical bond between the SH group and the polymer chain remains stable in solution.

In a broad sense the molecular weight of the polymers in the composition of this invention should be such that the polymer is soluble in the solvent that is used to treat the keratinic fibers and the solvent is one suitable for use on keratinic fibers.

In general the prefreed water soluble starting polymers of Formula B have a molecular weight of 300 to 40,000 prior to their reaction with the mercapto-amide amines of Formula C.

We have found that the viscosity of the starting polymer Formula B is approximately the same as the condensed polymers Formula A. The preferred polymers of this invention have a viscosity of about 0.1 to 0.5 in a 1% solution at 250° C. using a dimethylformamide or methyl ethyl ketone solvent.

The polysulfhydryl polymers of the invention can be prepared by a process in which a starting polymer having a recurring structural unit of the formula:

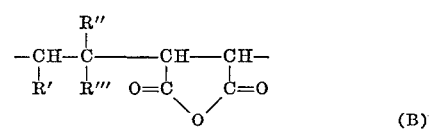

(B)

is condensed with a mercapto-amide amine having the formula:

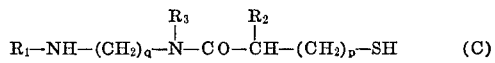

(C)

in which R', R", R''', $R_1$, $R_2$, $R_3$, $p$ and $q$ have the meanings given above. This condensation readily takes place in aqueous solution at temperatures in the neighborhood of the ambient temperature merely by bringing into contact the desired quantities of mercapto-amide amine and starting polymer. In the course of the condensation reaction, it may be desirable to neutralize the carboxylic function which forms by adding a base such as sodium hydroxide. The condensation product yields are generally very good and the desired polysulfhydryl polymer may be isolated by simple precipitation in acid medium.

It is preferred, though not essential, to carry out the condensation by using the mercapto-amide amine in a stoichiometric proportion to the anhydride function of the starting polymer. This produces a polysulfyhydryl polymer which has a high number of SH groups. In a preferred embodiment, the quantity of anhydride function which is converted to mercapto-amide is comprised between 70 and 90%.

The mercapto-amide amines corersponding to formula C are new compounds and as such form part of the present invention. The invention also concerns a new process for the preparation of the said mercapto-amide amines, in which a lower alkyl ester, for instance the methyl or ethyl ester, of a mercapto-carboxylic acid having the formula:

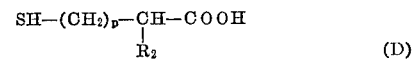

(D)

is condensed with a lower aliphatic diamine having the formula:

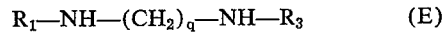

(E)

in which $R_1$, $R_2$, $R_3$, $p$ and $q$ have the meanings given above. Suitable mercapto-carboxylic acids whose esters can be used in this process are, for instance, thioglycolic, thiolactic, and β-mercaptopropionic acids; and suitable diamines are, for instance, ethylenediamine, trimethylenediamine and hydroxyethylethylenediamine.

Since mercapto-carboxylic acids and diamines suitable for use as starting materials for the preparation of the mercapto-amide amines of this invention are inexpensive substances, as are the starting polymers, the polysulfhydryl polymers of the invention can be obtained at a cost which makes them economically competitive.

The polysulfhydryl of the invention which are of particular interest are those polymers in which R′ and R″ each represent hydrogen and R‴ represents —OCOCH₃, —C≡N, —OC₂H₅, or —COOCH₃; and those in which R′ represents hydrogen, R″ represents —CH₃ and R‴ represents —COOCH₃.

As starting polymer, there may be used those which result from the copolymerization of maleic anhydride with a monomer possessing an active double bond, and in particular:

(a) copolymers of an aliphatic or aromatic vinyl ether and maleic anhydride, suitable vinyl ethers are, for instance vinylmethylether, vinylethylether and divinylphenylether;

(b) copolymers of an aromatic vinyl compound and maleic anhydride, for instance copolymers of styrene (or its homologs) and maleic anhydride;

(c) copolymers of a monoolefine and maleic anhydride, for instance copolymers of ethylene and maleic anhydride.

In accordance with the invention, it is desirable, but not essential, to use copolymers in which the proportion of maleic anhydride to the monomers having an active double bond is close to unity. Such polymers are available commercially.

The polymers of the present invention may be used for treating live human hair in the following manner. The hair is impregnated with an aqueous alkaline solution of the polysulfhydryl polymer, the hair is constrained to the desired shape and any undesired excess of said polymer is removed, after a short period of time one obtains a permanent deformation of the hair thus treated. If desired the hair after said impregnation can be rinsed and treated with a human hair oxidizing agent, such as hydrogen peroxide.

The polysulfhydryl polymers of this invention may also be employed to permanently deform keratinic textile fibers such as wool, which may thereafter be dyed with direct dyes.

The mercapto-amide amines of this invention are also reducing agents and as such may be used to carry out the reducing step of a permanent wave without the need of a separate reducing agent when they are present on the polymers of this invention, or as separate reducing agents when other polymers are used to form a permanent wave.

The invention is illustrated by the following examples:

EXAMPLE 1

Preparation of N-(β-aminoethyl)thioglycolamide

This compound, which has the formula

HS—CH₂—CONH—CH₂—CH₂—NH₂ is obtained in the following manner:

64 g. (1 g.-mol) of ethylene diamine (96%) are added to a round-bottomed flask which has a stirrer, a reflux condenser, a thermometer, a dropping funnel and a nitrogen supply tube.

126 g. (1 g.-mol) of ethylthioglycolate (95%) in solution in 100 cc. of absolute alcohol are introduced drop-by-drop with stirring while the temperature being maintained at about 40–45° C., whereafter the mixture is heated and refluxed for 20 minutes.

The product precipitates on cooling, whereafter it is separated and dried. 107 g. of N-(β-aminoethyl)thioglycolamide were obtained which corresponds to a yield of about 80%. This compound formed a white crystalline powder having a melting point of 133° C. and a purity of 99%.

Using the process of Example 1 and substituting a desired corresponding diamine and mercapto ester, one could produce the mercapto-amide amines of this invention, such as, (1) 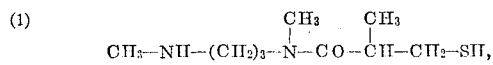

(2)     CH₃—NH—(CH₂)₂—NH—CO—CH₂—SH, (3)     CH₂OHNH—(CH₂)₃—NHCO—CH₂CH₂—SH, (4)     NH₂(CH₂)₆NHCO—CH₂—SH.

EXAMPLE 2A

This example describes the preparation of the polymer having a recurring structural unit of the Formula A, where:

R′, R″, R‴, R₁, R₂ and R₃ are all hydrogen, $p=0$ and $q=2$.

134 g. (1 g.-mol) of N-(β-aminoethyl)thioglycolamide, prepared as indicated in Example 1, and 600 cc. of water are introduced into a 3-litre round-bottomed flask provided with a stirrer, a thermometer and a nitrogen supply tube.

There are added with stirring and cooling 71.5 g. (0.5 g.-mol) of the ethylene/maleic anhydride copolymer sold under the trade name "Resine DX 840–11" by the Monsanto Chemical Company. The specific viscosity of this copolymer, determined as 1% solution in dimethylformamide at a temperature of 25° C., in 0.1. By titration, the ethylene/maleic anhydride ratio of this resin was found to be 1:0.88.

Then, to liberate the amine function by salifying the carboxyl group of the copolymer, there are added in small portions to the reaction mixture 20 g. (0.5 g.-mol) of sodium hydroxide in tablet form, whereafter a further addition of 71.5 g. of ethylene/maleic anhydride copolymer is made, following the above-indicated procedure, and 20 g. of sodium hydroxide in tablet form are again added in small fractions.

At the end of 2 hours, the reaction is complete and the product is acidified with concentrated hydrochloric acid in order to precipitate the desired product, which is washed a number of times with water and is dried in vacuo.

There are thus obtained 247 g. of polymer, which corresponds to a yield of about 90%. After drying, this polymer takes the form of a spongy friable mass.

*Analysis.*—By calculating the sulfhydryl group on the basis of the ethylene/maleic anhydride ratio of 1:0.88, which has been indicated above, the product thus obtained was subjected to the following checks:

By determining the sulfhydryl group by titration of the mercaptide into which the polymer is converted by the action of a solution of methyl iodide and an excess of mercury, there were found:

|  | Percent |
|---|---|
| Free SH (calculated) | 11.9 |
| Free SH (found) | 7.55 |

The extent of conversion seems to be 63%.

In order to check whether the difference between the percentage of SH calculated and the percentage of SH found is partly due to an oxidation which occurs during the condensation, the prepared polymer was subjected to a reduction of any —S—S-bonds present by means of sulfyitolysis and determination of the new SH groupings formed. In this way, there are found:

|  | Percent |
|---|---|
| SH (calculated) | 11.9 |
| SH (found) | 9.55 |

This new determination indicates that the extent of conversion is in fact 80%.

It is therefore found that the polymer obtained does in fact possess a very large part of its sulfhydryl functions in the free state.

EXAMPLE 2B

Following the procedure of Example 2A but substituting 1.0 g. mol of vinyl ethyloxide/maleic anhydride copolymer for the 1.0 g. mol of ethylene/maleic anhydride copolymer used in Example 2A which has the same specific viscosity (or a specific viscosity of 0.1–0.5) under the same conditions one obtains a polymer having a recurring structural unit of the Formula A, in which:

R', R", $R_1$, $R_2$ and $R_3$ are all H, R''' is $OC_2H_5$, $p=0$ and $q=2$.

EXAMPLE 3

This example describes the preparation of the polysulfhydryl polymer having a recurring structural unit of the Formula A, where R', R", $R_1$, $R_2$ and $R_3$ are all hydrogen, R''' is the radical —O—CO—$CH_3$, $p=0$ and $q=2$. N-(β-aminoethyl)thioglycolamide is condensed with a vinyl acetate/maleic anhydride copolymer, by the following procedure:

There is employed as starting product the vinyl acetate/maleic anhydride copolymer obtained in known manner by copolymerization of equimolecular quantities of vinyl acetate and maleic anhydride in toluene, in the presence of benzoyl peroxide acting as catalyst. A 1% solution of the copolymer thus obtained in dimethylformamide has at 25° C. a specific viscosity of 0.17. By titration of the anhydride function, it was found that the mol ratio of vinyl acetate to maleic anhydride is equal to 0.93:1.

33.5 g. (0.25 g.-mol) of N-(β-aminoethyl)-thioglycolamide and 250 cc. of water are introduced into a round-bottomed flask provided with a stirrer, a thermometer and a nitrogen supply tube. There are then added with stirring 22 g. (0.125 g.-mol) of the above defined vinyl acetate/maleic anhydride copolymer, followed by 12.5 cc. (0.125 g.-mol) of a 40% aqueous sodium hydroxide solution to liberate the amine which salified the carboxyl of the copolymer.

There are then simultaneously added 22 g. (0.125 g.-mol) of vinyl acetate-maleic anhydride copolymer and 12.5 cc. (0.125 g.-mol) of a 40% aqueous sodium hydroxide solution. When the reaction is complete, the product is acidified with concentrated hydrochloric acid, and the product which is precipitated is thereafter washed with water and then dried in vacuo.

In this way, 51.5 g. of polysulfhydryl polymer according to the invention are obtained in a yield of 67%.

This polymer, which takes the form of a powder soluble in water having an alkaline pH after drying, was subjected to the following analytical determinations:

|  | Percent |
| --- | --- |
| SH (calculated) | 10.6 |
| SH (found) | 6.58 |

After reduction of the oxidized part of the product, a further analytical determination was carried out, with the following results:

|  | Percent |
| --- | --- |
| SH (calculated) | 10.6 |
| SH (found) | 9.54 |

EXAMPLE 4

This example describes the preparation of a polysulfhydryl polymer having a recurring structural unit of the formula A, where R', R''', $R_1$, $R_2$ and $R_3$ are all hydrogen, R" is phenyl, $p=0$ and $q=2$.

N-(β-aminoethyl)thioglycolamide is condensed with a styrene/maleic anhydride copolymer, under the same conditions as are described in Example 1, except that the starting copolymer was a styrene/maleic anhydride copolymer sold under the trade name "Resine SMA 1000 A" by Texas Butadiene, the number of said structural units having been determined as equal to 8 and the styrene/maleic anhydride mol ratio having been determined as 1.31:1.

There was thus obtained, in a yield of 86%, a white powder which is soluble in water in alkaline medium, on which the following analytical determinations were made:

|  | Percent |
| --- | --- |
| SH (calculated) | 8.95 |
| SH (found) | 5.6 |

After reduction of the oxidized form of the product, there were found:

|  | Percent |
| --- | --- |
| SH (calculated) | 8.95 |
| SH (found) | 6.45 |

EXAMPLE 5

This example describes the preparation of a polysulfhydryl polymer having a recurring structural unit of the Formula A, where R', $R_1$, $R_2$ and $R_3$ are all hydrogen, R" is methyl, R''' is the radical —CO—O—$CH_3$, $p=0$ and $q=2$, by condensation of N-(β-aminoethyl)-thioglycolamide with a methyl methacrylate/maleic anhydride copolymer, using the following procedure:

There is employed as starting product the methyl methacrylate-maleic anhydride copolymer obtained in known manner by copolymerization in toluene of equimolecular quantities of methyl methacrylate and maleic anhydride, in the presence of azo-bis-isobutyronitrile as catalyst. In 1% solution in dimethyformamide, the poymer thus obtained has a specific viscosity of 0.088 at a temperature of 25° C. The methyl methacrylate/maleic anhydride mol ratio was determined by titration of the anhydride function as equal to 1.52:1.

By using the conditions described in Example 1, there is obtained in a yield of 67% a white powder which is soluble in water having an alkaline pH.

The following analytical determinations were made on this powder:

|  | Percent |
| --- | --- |
| SH (calculated) | 8.6 |
| SH (found) | 3.24 |

After reduction of the oxidized form of the product, a further analytical determination was made, which gave:

|  | Percent |
| --- | --- |
| SH (calculated) | 8.6 |
| SH (found) | 6.1 |

EXAMPLE 6

This example describes the preparation of a polysulfhydryl polymer having a recurring unit of Formula A, where R', R", $R_1$, $R_2$ and $R_3$ are all hydrogen, R''' is the radical —CN, $p=0$ and $q=2$, by condensing N-(β-aminoethyl)thioglycolamide with an acrylonitrile/maleic anhydride copolymer, using the following procedure:

There is employed as starting product the acrylonitrile/maleic anhydride copolymer obtained in known manner by copolymerization in toluene of equimolecular quantities of acrylonitrile and maleic anhydride in the presence of benzoyl peroxide as catalyst. A 1% solution of this polymer in dimethylformamide has at a temperature of 25° C. a specific viscosity of 0.055. By treating the anhydride function of this polymer, the acrylonitrile/maleic anhydride mol ratio was determined as equal to 1.19:1. By using the conditions of Example 1, there is obtained in a yield of 41% a white powder which is soluble in water in alkaline medium and to which the following analytical determinations were obtained:

|  | Percent |
| --- | --- |
| SH (calculated) | 11.2 |
| SH (found) | 6.5 |

After reduction of the oxidized form of the product, a further analytical determination was made, which gave:

|  | Percent |
| --- | --- |
| SH (calculated) | 11.2 |
| SH (found) | 9.37 |

EXAMPLE 7

This example describes the preparation of a polysulfhydryl polymer having a recurring structural unit of Formula A, where R', R", $R_1$, $R_2$ and $R_3$ are all hydrogen, R''' is —CO—O—CH₃, p=0 and q=2, by condensation of N-(β-aminoethyl)thioglycolamide with a methyl acrylate/maleic anhydride copolymer, using the following procedure:

The methyl acrylate/maleic anhydride copolymer obtained in known manner by copolymerization in toluene of equimolecular quantities of methyl acrylate and maleic anhydride in the presence of benzoyl peroxide as catalyst. A 1% solution in dimethylformamide of the copolymer thus obtained had a specific viscosity of 0.093 at a temperature of 250 C. The methyl acrylate/maleic anhydried mol ratio of this copolymer was determined by titration of the anhydride function as equal to 0.9:1.

By using the conditions of Example 1, N-(β-aminoethyl)thioglycolamide in condensed with the above-defined methyl acrylate/maleic anhydride copolymer, and there is obtained in a yield of 71% a white powder soluble in water in alkaline medium, on which the following analytical determinations were made:

|  | Percent |
|---|---|
| SH (calculated) | 10.7 |
| SH (found) | 5.95 |

After reduction of the oxidized form of the product, a further determination was made, which gave

|  | Percent |
|---|---|
| SH (calculated) | 10.7 |
| SH (found) | 9.2 |

EXAMPLE 8

This example describes the preparation of a polysulfhydryl polymer having a recuring structural unit of Formula A, where R', R'', R''', R₁, R₂ and R₃ are all hydrogen, p=0 and q=6, by condensation of N-aminohexyl thioglycolamide with an ethylene/maleic anhydride copolymer, by the following procedure:

There are introduced into a round-bottomed flask provided with a stirrer, a thermometer and a nitrogen supply tube 206 g. (1 g.-mol) of N-aminohexyl thioglycolamide prepared as indicated below in 1500 cc. of water. 71.5 g. (0.5 g.-mol) of the ethylene/maleic anhydride copolymer sold under the trade name "Resine DX 840–11" by the Monsanto Chemical Co. are then added with stirring and cooling. (By titration of the anhydride function of this copolymer, its ethylene/maleic anhydride mol ratio was determined as equal to 1.6:1.)

In order to liberate the amine which salifies the carboxyl of this copolymer, 50 cc. (0.5 g.-mol) of a 40% aqueous sodium hydroxide solution are added. Then, 71.5 g. (0.5 g.-mol) of the copolymer DX 840–11 and 50 cc. (0.5 g.-mol) of a 40% aqueous sodium hydroxide solution are simultaneously added. After the reaction, the product is acidified with concentrated hydrochloric acid.

The precipitated product is then washed with water and dried, whereby it is possible to obtain in a yield of 80% 268 g. of a white powder solube in water at an alkaline pH, from which the following analytical determinations were obtained.

|  | Percent |
|---|---|
| SH (calculated) | 9.8 |
| SH (found) | 6.1 |

After reduction of the oxidized form of the product, a further determination was made, which gave the following results:

|  | Percent |
|---|---|
| SH (calculated) | 9.8 |
| SH (found) | 8.05 |

The N-aminohexyl thioglycolamide, a compound of the formula:

HS—CH₂—CONH—(CH₂)₆—NH₂ used in this example had been obtained by placing 43.6 g. (0.375 g.-mol) of 99% hexamethylenediamine in solution in 50 cc. of dioxan in a round-bottomed flask provided with a stirrer, a reflux condenser, a thermometer, a dropping funnel and a nitrogen supply tube. 45 g. (0.375 g.-mol) of 99% ethyl thioglycolate are then introduced drop-by-drop with stirring, the temperature being maintained between 35° and 45° C. It is observed that a precipitate forms before the end of the introduction of the latter product, and when the reaction is complete, the product is cooled, and an abundant precipitate is obtained, which is thereafter separated and dried.

The product which is obtained, in a yield of 66%, is a white crystalline powder which melts at 122° C. and which has a purity of 92%. Since this compound is unstable, it should be redissolved in water and immediately used to deform keratinic fibers.

EXAMPLE 9

This example describes the preparation of a polysulfhydryl polymer having a recurring structural unit of Formula A, where R', R'', R''', R₁ and R₃ are all hydrogen, R₂ is methyl, p=0 and q=2, by condensation of N-(β-aminoethyl)thiolactamide with an ethylene/maleic anhydride copolymer, by the following procedure:

N-(β-aminoethyl)thiolactamide is condensed with the ethylene/maleic anhydride polymer of the proceding example under the same conditions as have been described in the preceding example. There is thus obtained in a yield of 65%, a white powder that is soluble in an alkaline water medium, on which the following analytical determinations were made:

|  | Percent |
|---|---|
| SH (calculated) | 10.8 |
| SH (found) | 7.0 |

After reduction of the oxidized form of the product, a further determination was made, which gave the following results:

|  | Percent |
|---|---|
| SH (calculated) | 10.8 |
| SH (found) | 9.5 |

The N-(β-aminoethyl)thiolactamide of the formula:

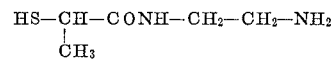

HS—CH—CONH—CH₂—CH₂—NH₂
         |
         CH₃ used in this example had been obtained by introducing 12.5 g. (0.2 g.-mol) of 95% ethylenediamine into a spherical flask provided with a stirrer, a thermometer, a dropping funnel and a nitrogen supply tube. The temperature of this round-bottomed flask is then brought to 80° C., whereafter there are added drop-by-drop with stirring 32.4 g. (0.2 g.-mol) of 100% butyl thiolactate in solution in 20 cc. of ethanol. When this addition is complete, the temperature is maintained at 85/90° C. for an additional hour.

After cooling, the precipitate formed is separated and dried. It forms a white crystalline powder melting at 112/114° C. and having a purity of 95%. The yield is 64%. This compound is fairly stable and it need not be used immediately after its preparation.

EXAMPLE 10

This example describes the preparation of a polysulfhydryl polymer having a recurring structural unit of the Formula A, where R', R'', R''', R₂ and R₃ are all hydrogen is R₁ is —CH₂CH₂—OH, P=O and q=2, by condensing N - (hydroxyethyl-aminoethyl) - thioglycolamide with an ethylene/maleic anhydride polymer, by the following procedure.

Using the conditions described in Example 8, N-(hydroxyethyl-aminoethyl)thioglycolamide obtained as indicated below is condensed with the ethylene/maleic anhydride copolymer of Example 8. In this way, there is obtained in a yield of 58% a white powder soluble in an aqueous alkaline medium, which had the following analytical determinations:

|   | Percent |
|---|---|
| SH (calculated) | 10.3 |
| SH (found) | 3.8 |

After reduction of the oxidized form of the product, a further analytical determination was made, which gave the following results:

|   | Percent |
|---|---|
| SH (calculated) | 10.3 |
| SH (found) | 7.6 |

The N-(hydroxyethylaminoethyl)thioglycolamide of the formula:

$$HS-CH_2-CONH-CH_2-CH_2-NHCH_2-CH_2-OH$$

used in this example has been obtained by introducing 26 g. (0.25 g.-mol) of N-(hydroxyethyl)ethylenediamine and 20 cc. of water into a round-bottomed flask provided with a stirrer, a thermometer, a dropping funnel and a nitrogen supply tube. 30 g. (0.25 g.-mol) of 99% ethyl thioglycolate are thereafter introduced drop-by-drop at ambient temperature with stirring, and the mixture is left in for five days at ambient temperature, with periodical stirring.

The product obtained, which could not be isolated, was directly titrated in the solution, from which an extent of reaction of 100% was analytically determined.

EXAMPLE 11

This example describes the preparation of a polysulfhydryl polymer having a recurring structural unit of Formula A, where R', R'', R''', $R_2$ and $R_3$ are all hydrogen, $R_1$ is ethtyl, $p=0$ and $q=3$, by condensing N-(ethylaminopropyl)thioglycolamide with the ethylene/maleic anhydride copolymer, by the following procedure:

Using the conditions described in Example 8, N-(ethylaminopropyl)thioglycolamide is condensed with the ethylene/maleic anhydride copolymer of Example 8, to obtain in a yield of 47% a white powder soluble in an aqueous alkaline medium.

The polymer thus obtained was subjected to the following analytical determinations:

|   | Percent |
|---|---|
| SH (calculated) | 9.6 |
| SH (found) | 5.05 |

After reduction of the oxidized form of the product, a further analytical determination was made, which gave the following results:

|   | Percent |
|---|---|
| SH (calculated) | 9.06 |
| SH (found) | 7.2 |

The N-(ethylaminopropyl)thioglycolamide of the formula:

$$HS-CH_2-CONH-(CH_2)_3-NH-C_2H_5$$

used in this example has been obtained by introducing 20.4 g. (0.2 g.-mol) of N-(ethylaminopropyl)amine into a round-bottomed flask provided with a stirrer, a thermometer, a dropping funnel and a nitrogen supply tube. The temperature of the flask is then brought to 45° C. and there are introduced drop-by-drop with stirring 24 g. (0.2 g.-mol) of ethyl thioglycolate (99%) in solution in 20 cc. of ethyl alcohol. When the addition is complete, the product is refluxed for several minutes.

After cooling, the precipitate obtained is separated and dried. This product, which is obtained in a yield of 60%, is a white crystalline powder melting at 92/93° C., which has a purity of 100%. The compound obtained is unstable and must be rapidly redissolved and used immediately to treat keratinic fibers or human hair.

EXAMPLE 12

A polysulfhydryl polymer of the following formula is prepared

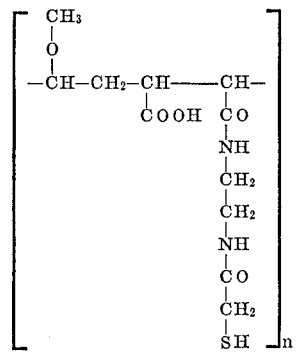

by condensation of the N-(β-aminoethyl)thioglycolamide on a maleic anhydride/methyl vinylic ether copolymer in the following manner:

Add 134 g. (1 mol-g.) of N-(β-aminoethyl)thioglycolamide prepared as indicated in Example 1, and 600 ml. of water in a 3 litre flask which has an agitator, a thermometer and an tube for adding $N_2$.

Add while agitating and cooling 77.5 g. (0.5 mol-g.) of maleic anhydride/methyl vinylic ether copolymer, sold under the commercial name of "Resin AN 119" by Ste General Aniline. The specific viscosity of this polymer determined in solution at 1% in the methyl ethyl ketone at 25° C. is 0.1 to 0.5.

Then, to free the amine function for salification, add, in small portions to the reaction mixture, 20 g. (0.5 mol-g.) of NaOH in tablet form after which, a further addition of 77.5 g. (0.5 mol-g.) of maleic anhydride/methyl vinylic ether copolymer is made by proceeding as indicated above, then again adding in small portions 20 g. of NaOH tablets.

After two hours the reaction is completed and the mixture is acidified with concentrated chlorhydric acid to precipitate the search product. After washing several times in water and then drying under a vacuum, 245 g. of polymer, which corresponds to a yield of about 85%, is obtained. This polymer after drying is a white powder which is soluble in an aqueous alkaline solution.

EXAMPLE 13

For effecting permanent hair waving there is prepared a solution having the following composition.

Product resulting from the action of: N-(β-aminoethyl) thioglycolamide on the ethylene/maleic anhydride copolymer, obtained in accordance with Example 2A— 14 g.
Urea—10 g.
Ammonia (20%) q.s.p.—pH 9.8
Water q.s.p.—100 cc.

The hair is impregnated with this solution and wound on curlers by the usual method adopted to effect a permanent wave. After a period of contact of the order of 20 minutes, the hair is carefully rinsed in hot water and the so-called "setting" phase is proceeded with, using a hydrogen peroxide solution (6 vol.). After contact for 5 mintues with this oxidizing solution, the hair is again abundantly rinsed. There is obtained a permanent deformation of the hair, which has good stability to moisture.

EXAMPLE 14

For carrying out a permanent wave in accordance with the invention, there is prepared a solution having the following composition:

Product resulting from the action of N-(β-aminoethyl) thioglycolamide on a vinyl acetate/maleic anhydride copolymer obtained in accordance with Example 3—
10 g.
Urea—9 g.
Ammonia (20%) q.s.p.—pH 9.8
Water q.s.p.—100 g.

This solution is applied to hair using the procedure described in Example 13. There is thus obtained a permanent hair wave having good stability to moisture.

EXAMPLE 15

For treating the hair in accordance with the invention, there is prepared a solution having the following composition:

Product resulting from the action of N-(β-aminoethyl) thioglycolamide on a styrene/maleic anhydride copolymer obtained in accordance with Example 4—12 g.
Urea—8 g.
20% ammonia q.s.p.—pH 9.5
Water q.s.p.—100 g.

This solution is applied to hair using the procedure described in Example 13. There is thus obtained a permanent deformation of the hair having excellent stability to moisture.

EXAMPLE 16

For treating the hair in accordance with the invention, it is impregnated with a solution having the following composition:

Product resulting from the action of N-(β-aminoethyl) thioglycolamide on a methyl methacrylate/maleic anhydride copolymer obtained in accordance with Example 5—12.5 g.
Ammonia (20%) q.s.p.—pH 9.8
Water—100 g.

After an interval of 20 minutes, the hair is amundantly rinsed for at least two minutes with hot water. A permanent wave of very good quality and stability is obtained.

EXAMPLE 17

There is prepared a solution having the following compositions:

Polymer resulting from the action of N-(β-aminoethyl) thioglycolamide on an acrylonitrile/maleic anhydride copolymer obtained in accordance with Example 6—13 g.
Urea—9 g.
Ammonia (20%) q.s.p.—pH 9.5
Water q.s.p.—100 g.

When applied to the hair in accordance with the technique of Example 15, this solution gives a permanent deformation of the hair of very good quality.

EXAMPLE 18

For treating the hair in accordance with the invention, a solution having the following composition is prepared:

Product of composition of N-(β-aminoethyl)thioglycolamide with an ethylene/maleic anhydride copolymer obtained in accordance with Example 8—8 g.
20% ammonia q.s.p.—pH 9.5
Water q.s.p.—100 g.

The hair is impregnated with this solution and a styling is effected in a conventional manner. There is thus obtained a permanent deformation which imparts to the hair style produced properties which are clearly superior to those obtained by the usual method.

In the course of this styling, which comprises the following phases:

moistening
winding on curlers
drying (the excess of ammonia evaporates), there remains in and on the fibre a part of the polymer formed, the result of which is that the hair is well set, this being achieved by a very simple operation.

The hair treating examples set forth above employed a preferred pH of 9.5. It should be noted that this pH is not critical and that a pH range of 3 to 10 could have been used to illustrate the invention.

In a similar manner the commercially available polymer

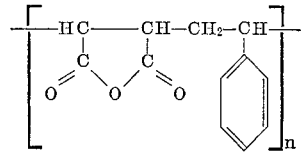

could be substituted for the specific starting polymers (Formula B) set forth in the examples in which the molecular weight is 400 to 600.

The polymers of this invention have the following illustrative recurring structural units:

(1) 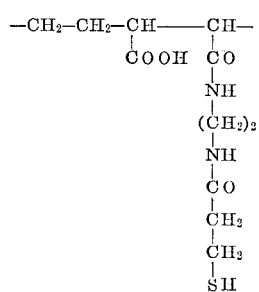

(2) 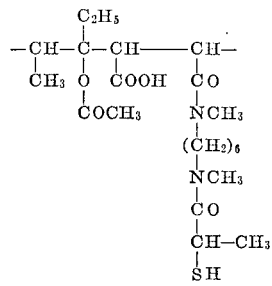

(3) 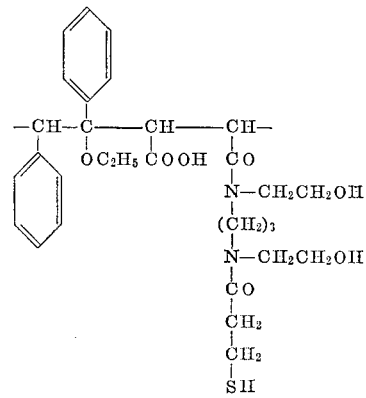

(4) 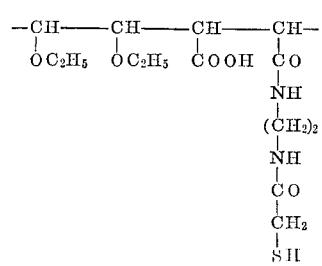

(5) 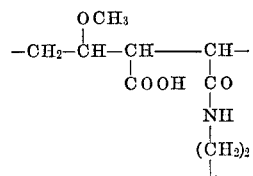

(6) 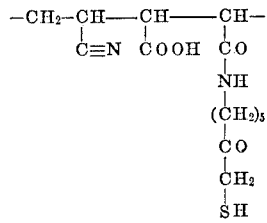

(7) 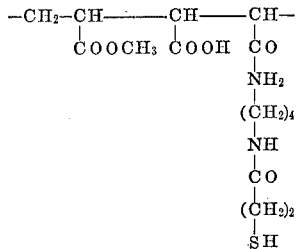

What is claimed is:

1. A solid polysulfhydryl polymer consisting essentially of recurring structural units of formula:

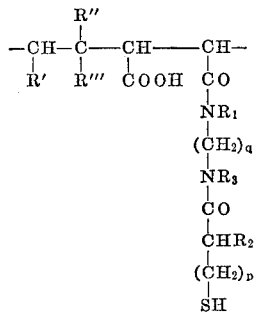

in which $R_1$ and $R_3$ are selected from the group consisting of H, lower alkyl and lower hydroxy alkyl;

$R_2$ is selected from the group consisting of H and —$CH_3$;

$q$ is 2 to 6;

$p$ is 0 or 1;

R' and R'' are selected from the group consisting of H, lower alkyl, phenyl and lower alkoxy; and R''' is selected from the group consisting of H, —O—CO—$CH_3$, —C≡N, —$OC_2H_5$ and —$COOCH_3$ 2. A polymer of claim 1, which is soluble in an alkaline aqueous medium.

3. The polymer of claim 1, wherein said R', R'', R''', $R_1$, $R_2$ and $R_3$ are all H, $p=0$ and $q=2$.

4. The polymer of claim 1, wherein R', R'', $R_1$, $R_2$ and $R_3$ and all H, R''' is —O—CO—$CH_3$, $p=0$ and $q=2$.

5. The polymer of claim 1, wherein R', R''', $R_1$, $R_2$ and $R_3$ are all H, R'' is phenyl, $p=0$ and $q=2$.

6. The polymer of claim 1, wherein R', $R_1$, $R_2$ and $R_3$ are all H, R'' is methyl, R''' is —CO—O—$CH_3$, $p=0$, and $q=2$.

7. The polymer of claim 1, wherein R', $R_2$, R'', $R_1$ and $R_3$ are all H, R''', is —CN, $p=0$ and $q=2$.

8. The polymer of claim 1, wherein R', R'', $R_1$, $R_2$ and $R_3$ are all H, R''' is —CO—O—$CH_3$, $p=0$ and $q=2$.

9. The polymer of claim 1, wherein R', R'', R''', $R_1$, $R_2$ and $R_3$ are all H, $p=0$ and $q=6$.

10. The polymer of claim 1, wherein R', R'', R''', $R_1$ and $R_3$ are all H, $R_2$ is methyl, $p=0$ and $q=2$.

11. The polymer of claim , wherein R', R'', R''', $R_2$ and $R_3$ are all H, $R_1$ is —$CH_2$—$CH_2OH$, $p=0$ and $q=2$.

12. The polymer of claim 1, wherein R', R'', R''', $R_2$ and $R_3$ are all H, $R_1$ is ethyl, $p=0$ and $q=3$.

13. A polymer of claim 1, which has a viscosity of about 0.1 to 0.5 in a 1% solution of dimethylformamide at 25° C.

14. The polymer of claim 1, wherein R'', R''', $R_1$, $R_2$ and $R_3$ are H, R' is —$OCH_3$, $p=0$ and $q=2$.

15. The polymer of claim 1, wherein R', R'', $R_1$, $R_2$ and $R_3$ are H, R''' is $OC_2H_5$, $p=0$ and $q=2$.

16. A process for preparing the polymers of claim 1, which comprises condensing by amidification and hydrolysis in an aqueous medium a starting soluble polymer consisting essentially of a recurring structural unit of the formula:

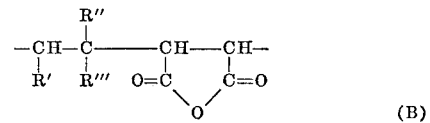

wtih a mercapto-amide amine of the formula

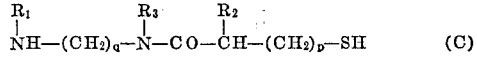

wherein R' and R'' are selected from the group consisting of hydrogen, lower alkyl, phenyl and lower alkoxy, R''' is selected from the group consisting of hydrogen, —$OCOCH_3$, —C≡N, —$OC_2H_5$ and —$COOCH_3$, $R_1$ and $R_3$ are selected from the group consisting of hydrogen, lower alkyl and hydroxy lower alkyl, $R_2$ is selected from the group consisting of hydrogen and —$CH_3$, $q$ is 2–6 $p$ is 0 or 1.

17. The process of claim 16, in which in the course of the condensation, the carboxylic acid product which forms is neutralized with a base.

References Cited

UNITED STATES PATENTS 3,039,870  6/1962  Laakso et al.
3,157,595  11/1964  Johnson et al.
3,398,226  8/1968  Yamamoto et al. _____ 260—78

HAROLD D. ANDERSON, Primary Examiner

U.S. Cl. X.R.

260—29.2, 32.6, 32.8, 47, 534; 424—71, 72

UNITED STATES PATENT OFFICE
CERTIFICATE OF CORRECTION

Patent No. 3,549,602          Dated December 22, 1970

Inventor(s) Gregoire Kalopissis and Andre Viout

It is certified that error appears in the above-identified patent and that said Letters Patent are hereby corrected as shown below:

Column 2, line 9, change "250°C" to --25°C--;
Column 7, Line 11, change "250C" to --25°C--; and
Column 11, line 35, change "amundantly" to --abundantly--.

Signed and sealed this 14th day of September 1971.

(SEAL)
Attest:

EDWARD M. FLETCHER, JR.
Attesting Officer

ROBERT GOTTSCHALK
Acting Commissioner of Pate